(12) United States Patent
Gehron et al.

(10) Patent No.: US 8,236,190 B2
(45) Date of Patent: Aug. 7, 2012

(54) RECAST REMOVAL METHOD

(75) Inventors: Michael J. Gehron, Stuart, FL (US);
Henry M. Hodgens, Fort Pierce, FL (US)

(73) Assignee: United Technologies Corporation, Hartford, CT (US)

( * ) Notice: Subject to any disclaimer, the term of this patent is extended or adjusted under 35 U.S.C. 154(b) by 843 days.

(21) Appl. No.: 12/138,710

(22) Filed: Jun. 13, 2008

(65) Prior Publication Data
US 2009/0308761 A1 Dec. 17, 2009

(51) Int. Cl.
*C03C 15/00* (2006.01)
*C03C 25/68* (2006.01)
*C25F 3/00* (2006.01)

(52) U.S. Cl. .............................. 216/109; 216/83; 216/96

(58) Field of Classification Search .................... 216/109
See application file for complete search history.

(56) References Cited

U.S. PATENT DOCUMENTS

| | | | |
|---|---|---|---|
| 2,684,892 A * | 7/1954 | Saulnier ........................ | 216/106 |
| 3,242,062 A * | 3/1966 | Covington et al. ........... | 205/684 |
| 4,353,780 A | 10/1982 | Fishter et al. | |
| 4,411,730 A * | 10/1983 | Fishter et al. .................. | 216/94 |
| 4,425,185 A * | 1/1984 | Fishter et al. ................. | 216/103 |
| 4,534,823 A * | 8/1985 | Fishter et al. ................. | 216/108 |
| 6,049,978 A | 4/2000 | Arnold | |
| 6,359,254 B1 | 3/2002 | Brown | |
| 6,843,928 B2 | 1/2005 | Cline et al. | |
| 7,094,450 B2 | 8/2006 | Nagaraj et al. | |
| 7,172,012 B1 | 2/2007 | Memmen | |
| 7,278,463 B2 | 10/2007 | Snyder et al. | |
| 7,306,026 B2 | 12/2007 | Memmen | |
| 7,334,625 B2 | 2/2008 | Judge et al. | |
| 2002/0189632 A1 | 12/2002 | Glock et al. | |
| 2006/0210813 A1 * | 9/2006 | Fath et al. ...................... | 428/457 |

FOREIGN PATENT DOCUMENTS

JP 07 102381 4/1995

OTHER PUBLICATIONS

European Search Report for EP Application No. 09251593.1, Dec. 2, 2009.
Wang et al., "Recast Layer Removal After Electrical Discharge Machining via Taguchi Analysis: A Feasibility Study," Journal of Materials Processing Technology 20090421 Elsevier Ltd.; The Boulevard GB, vol. 209, No. 8, Apr. 21, 2009, pp. 4134-4140 (XP002554834).

* cited by examiner

*Primary Examiner* — Nadine G Norton
*Assistant Examiner* — Stephanie Duclair
(74) *Attorney, Agent, or Firm* — Carlson, Gaskey & Olds, P.C.

(57) ABSTRACT

A method of removing recast from a substrate is disclosed. The method includes chemically removing the recast using an etchant, which provides a visual indication of the presence of the recast when the part has been removed from the etchant. One example chemical etchant is comprised of a sulfuric acid solution that includes sodium chloride, sodium fluoride and ammonium persulfate. After chemical removal of the recast from the substrate, the recast is physically removed from the substrate, for example, by media blasting. The chemical and physical recast removal process can be repeated as desired. To ensure that all the recast has been removed, the substrate is wiped, for example, using a cloth. If all the recast has been removed, the cloth will not change in appearance or color.

16 Claims, 1 Drawing Sheet

RECAST REMOVAL METHOD

BACKGROUND

This disclosure relates to removing a recast layer from a metal substrate, such as a turbine blade.

Structures used in the aerospace industry, such as turbine blades, typically include complex passages that are provided in a substrate formed of a superalloy. Passages, such as cooling holes extending from an inner passage to an outer surface of the turbine blade, cannot be machined using conventional metal removal processes such as drilling. These cooling holes and other cooling passages are often formed using an electrical discharge machining (EDM) process, which results in a recast layer in the machined area. The recast layer has different metallurgical characteristics than that of the substrate. For example, the recast layer may include small cracks due to shrinkage as the molten metal from the EDM process resolidifies.

This recast layer is typically removed from the substrate. A process has been developed by which the recast layer is removed from the substrate using a chemical milling process. The chemical milling process includes submersing the substrate in an etchant, which comprises a solution of $HNO_3$, $HCl$, $H_2O$, $FeCl_3$ and $CuSo_4$. As the recast is removed from the substrate, gases are evolved on the surface of the substrate. Once the gases cease evolving, it was believed that all of the recast material had been removed from the substrate.

SUMMARY

A method of removing recast from a substrate is disclosed. The method includes chemically removing the recast using an etchant, which provides a visual indication of the presence of the recast when the part has been removed from the etchant. One example chemical etchant is comprised of a sulfuric acid solution that includes sodium chloride, sodium fluoride and ammonium persulfate. After chemical removal of the recast from the substrate, the recast is physically removed from the substrate, for example, by media blasting. The chemical and physical recast removal process can be repeated as desired. To ensure that all the recast has been removed, the substrate is wiped, for example, using a cloth. If all the recast has been removed, the cloth will not change in appearance or color.

BRIEF DESCRIPTION OF THE DRAWINGS

The disclosure can be further understood by reference to the following detailed description when considered in connection with the accompanying drawings wherein.

DETAILED DESCRIPTION

Figure 1:
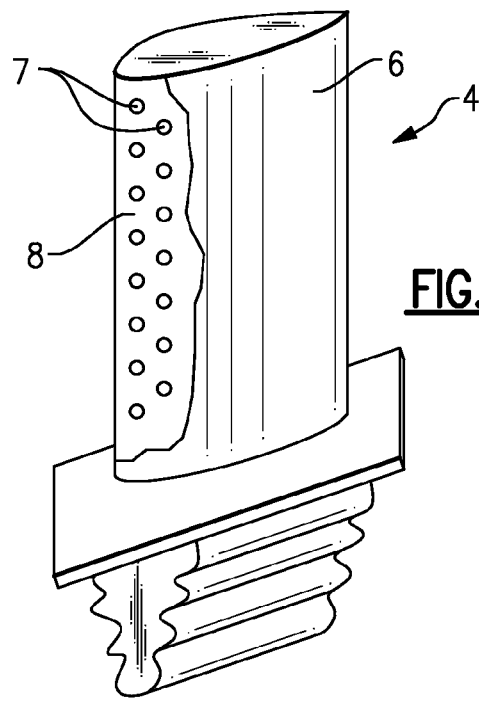
FIG. 1 is an example aerospace part having recast.
Figure 2:
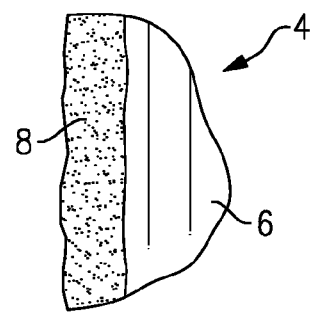
FIG. 2 is an enlarged cross-section view of the part depicting the recast layer.

Referring to FIGS. 1 and 2, a recast layer 8 is produced during a machining process, such as electrodischarge machining holes 7, to remove material from a substrate 6, such as an airfoil 4. Any suitable process, such as EDM, is employed to form the holes. It is desirable to remove the recast layer 8 from the substrate 6 to improve the integrity of the part. Removing the recast layer 8 from the substrate 6 without removing or altering any of the substrate 6 tends to improve the integrity of the part.

Figure 3:
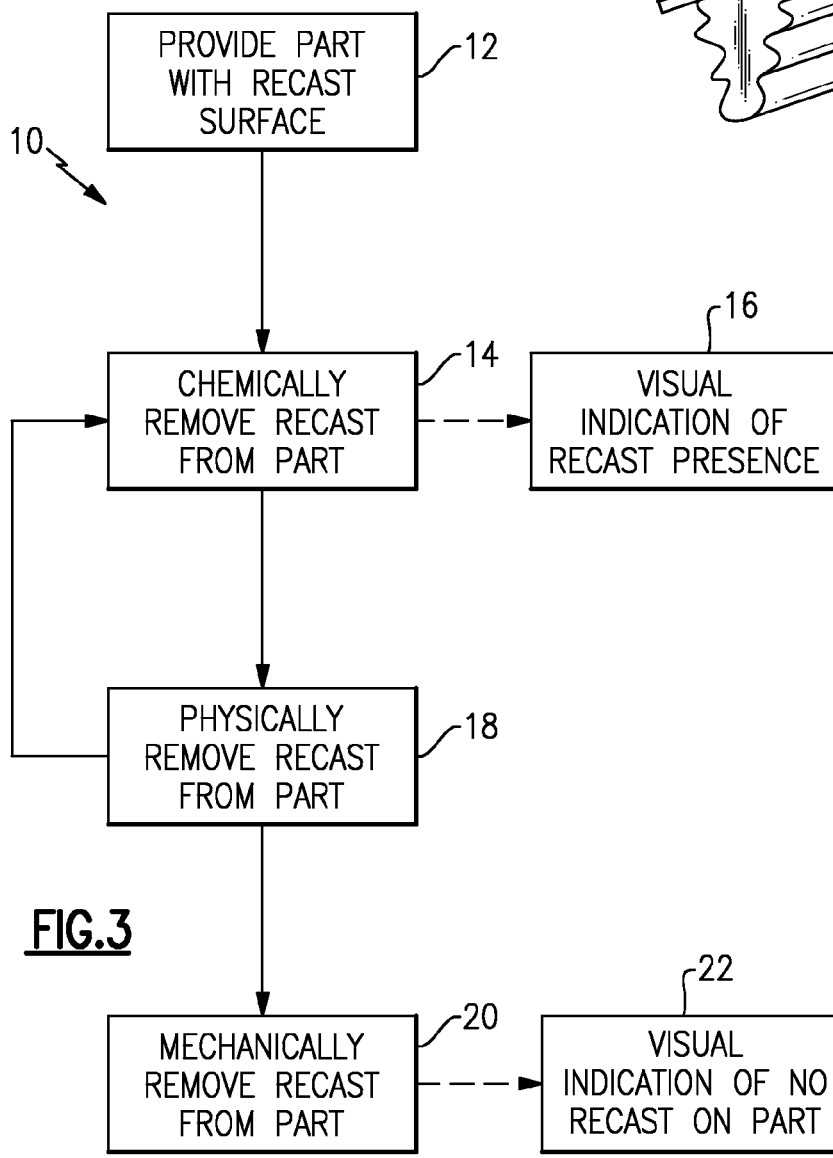
FIG. 3 schematically illustrates an example method of removing recast from a part.

An example method of removing recast is schematically illustrated by a method 10 shown in FIG. 3. The method 10 includes providing a part with a recast surface, as indicated at block 12. In one example, the part is an airfoil constructed from a nickel superalloy, such as IN718. The substrate may include a recast layer approximately $2.36 \times 10^{-5}$ mm (0.0006 inch) thick subsequent to forming a hole by EDM, for example.

The part is immersed in a chemical etchant. The part may be media blasted prior to immersion of the part in the chemical etchant to increase the activity of the chemical etchant at the surface of the substrate. In one example, the chemical etchant is a solution of sulfuric acid containing sodium chloride, sodium fluoride and ammonium persulfate. In one example, one liter (33.8 oz) of etchant is produced by adding approximately 145-165 mL (4.9 oz-5.6 oz) of concentrated sulfuric acid (approximately 95-98% in one example) to 700 mL (23.7 oz) of water. In one example, the sulfuric acid is 152 mL (5.1 oz). The solution is allowed to cool to below 80° F. (26.7° C.) subsequent to the resultant exothermic reaction. Approximately 55-85 grams (1.9 oz-3.0 oz) of sodium chloride and 3-7 grams (0.1 oz-0.2 oz) sodium fluoride are added to the solution. In one example, 72 grams (2.5 oz) of sodium chloride and 5 grams (0.2 oz) of sodium fluoride are added to the solution. Approximately 55-85 grams (1.9 oz-3.0 oz) of ammonium persulfate are added to the solution. In one example, 72 grams (2.5 oz) of ammonium persulfate are added to the solution. The solution is brought to the one liter (33.8 oz) final volume with water.

The part is immersed in the solution at approximately room temperature for between approximately 5 and 30 minutes and then removed from the etchant and rinsed, if desired. The chemical etchant chemically removes approximately 90% of the recast layer, as indicated at block 14. The chemical removal process results in a visual indication on the part that recast is present, as indicated at block 16. That is, chemically removed recast can be seen with the naked eye. The visual indication is the formation of a dark, soft material on the substrate that is darker than the surrounding substrate, which remains visible after the part is removed from the etchant.

The chemical etchant removes the recast layer from the substrate through a catalytic process. The persulfate disassociates from the ammonium persulfate in solution producing a monoatomic chlorine at the surface of the substrate where selective oxidation takes place. However, the persulfate does not oxidize the substrate itself. The fluoride disassociated from the sodium fluoride keeps the surface of the substrate active. Hydrochloric acid is formed by the sodium chloride dissolved in the sulfuric acid.

The remaining recast on the substrate and the material clinging to the substrate may be physically removed from the part, as indicated at block 18. Example physical removal processes are sonic agitation, immersion in an alkali cleaner, physical brushing or media blasting. For example, the recast can be removed using a vapor blast process with 1250 grit novaculite at 344 kPa (50 psig).

The part can be reimmersed in the chemical etchant to further remove any remaining recast. Additional immersions of the part will produce less, spotty darkening, if there is some remaining recast on the substrate. After the chemical and physical removal of the recast has been repeated a desired number of times, any remaining recast can be mechanically removed, as indicated at block 20. For example, a material, such as a light colored cloth, may be rubbed or wiped on the substrate to mechanically remove the remaining recast. Any remaining recast will be deposited on the cloth, providing a visual indication that recast was still on the substrate. The part can be rubbed with a clean cloth until there is no change in the color of the cloth, which indicates that there is no remaining recast on the substrate (block 22).

Tests have indicated that the substrate has not been compromised as a result of immersion into the disclosed chemical etchant. That is, no substrate material has been removed from the substrate. Recast removal has been confirmed by immersing the part in a descaling solution, such as an acid, and plating the part with nickel. Metallographic examination of the interface between the nickel plate and stripped substrate revealed no remaining recast or other undesired substrate surface characteristics.

Although a preferred embodiment has been disclosed, a worker of ordinary skill in this art would recognize that certain modifications would come within the scope of the claims. For that reason, the following claims should be studied to determine their true scope and content.

What is claimed is:

1. A method of removing recast from a substrate comprising the steps of:
    immersing a substrate having recast in a solution of acid including ammonium persulfate, wherein the acid is sulfuric acid; and removing the recast from the substrate with the solution.

2. The method according to claim 1, wherein the solution includes approximately 145-165mL of the sulfuric acid at approximately 95-98% concentration per liter of solution.

3. The method according to claim 1, wherein the solution includes sodium fluoride.

4. The method according to claim 3, wherein the solution includes approximately 3-7 grams of the sodium fluoride per liter of solution.

5. The method according to claim 3, wherein the solution includes sodium chloride.

6. The method according to claim 5, wherein the solution includes approximately 55-85 grams of the sodium chloride per liter of solution.

7. The method according to claim 1, wherein the solution includes approximately 55-85 grams of ammonium persulfate per liter of solution.

8. The method according to claim 1, wherein the removing step does not remove the substrate.

9. The method according to claim 1, wherein the removing step produces a material comprising chemically removed recast, the material having a different color than the recast.

10. The method according to claim 9, comprising the step of physically removing recast from the substrate after the chemical removal step.

11. The method according to claim 10, wherein the physical removing step includes media blasting the substrate.

12. A method of removing recast from a substrate comprising the steps of:
    immersing a substrate having recast in a solution wherein the solution includes ammonium persulfate dissolved in sulfuric acid; and chemically removing the recast from the substrate with the solution without removing substrate material from the substrate.

13. The method according to claim 12, comprising the step of physically removing recast from the substrate after the chemical removal step.

14. The method according to claim 13, wherein the physical removing step includes media blasting the substrate.

15. The method according to claim 12, wherein the chemical removal step provides a visual indication on the substrate with the substrate removed from the solution.

16. The method according to claim 12, comprising wiping the substrate with a material, and providing a visual indication on the material of the presence of recast on the substrate.

\* \* \* \* \*